United States Patent [19]

Berly

[11] 4,051,750
[45] Oct. 4, 1977

[54] MACHINE TOOLS

[75] Inventor: Marcel Berly, Verrieres le Buisson, France

[73] Assignee: H. Ernault-Somua, Velizy-Villacoublay, France

[21] Appl. No.: 754,994

[22] Filed: Dec. 28, 1976

[30] Foreign Application Priority Data

Jan. 26, 1976  France ............................. 76.01992

[51] Int. Cl.² .................. B23B 3/00; B23B 29/00; B23B 3/16
[52] U.S. Cl. ................................ 82/2 R; 82/36 A; 29/36
[58] Field of Search ............ 82/2 R, 2 B, 36 A; 29/36

[56]  References Cited

U.S. PATENT DOCUMENTS

| 639,888 | 12/1899 | Couradson | 29/36 |
| 3,288,005 | 11/1966 | Tringale et al. | 82/36 A |
| 3,943,802 | 3/1976 | Luebkemann et al. | 82/2 R |
| 3,955,257 | 5/1976 | Herbst et al. | 82/36 A |

FOREIGN PATENT DOCUMENTS

| 2,407,265 | 8/1975 | Germany | 82/2 B |
| 313,643 | 11/1971 | U.S.S.R. | 82/36 A |

*Primary Examiner*—Harrison L. Hinson
*Attorney, Agent, or Firm*—Max Fogiel

[57]  ABSTRACT

A machine tool, such as a lathe, comprises a rotary workpiece spindle and a tool turret assembly which comprises a main turret and an auxiliary turret each carrying a plurality of tools. The main turret is pivotable about an axis parallel to the axis of the workpiece spindle, the auxiliary turret being pivotably mounted on the main turret eccentrically with respect to the pivotal axis of the main turret, so that each tool on the auxiliary turret can be selectively brought into an unobstructed operative position in a predetermined inoperative angular position of the main turret.

5 Claims, 6 Drawing Figures

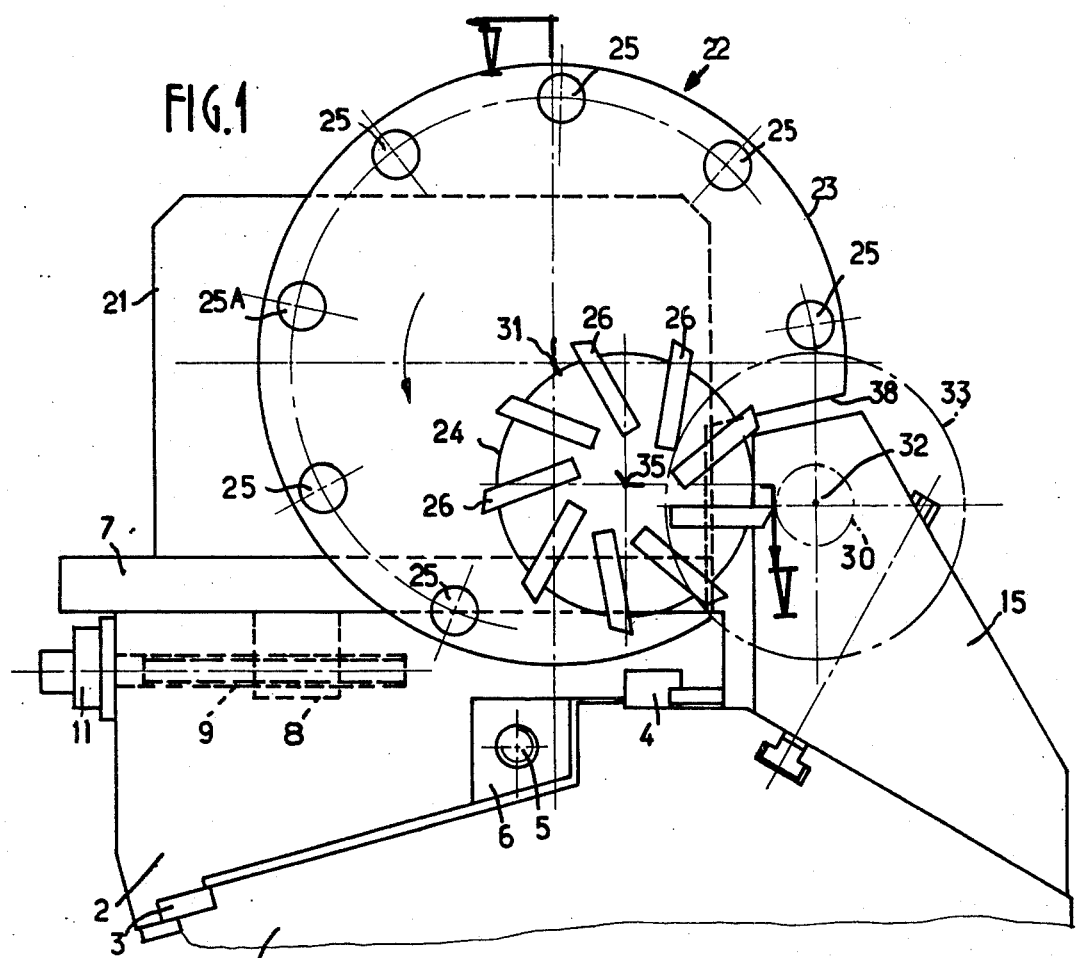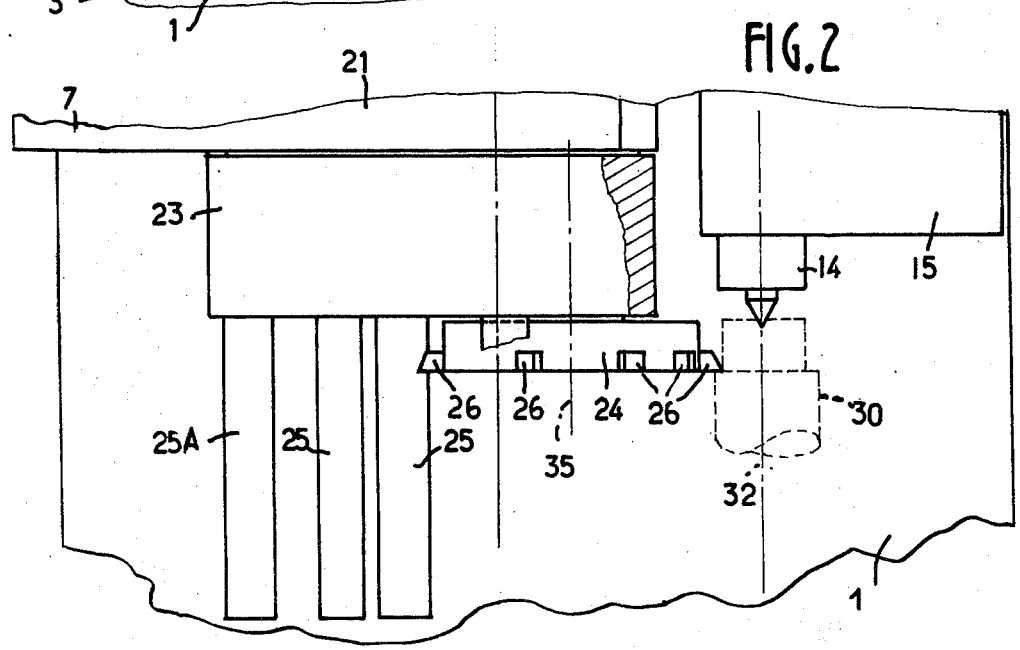

MACHINE TOOLS

BACKGROUND OF THE INVENTION

The invention relates to machine tools which comprise a rotary workpiece spindle, inter alia to lathes, particularly digitally controlled lathes.

Machines of this kind can be used for internal machining operations, using boring tools, and external machining operations, using turning tools. They are frequently equipped with two separate tool turrets, i.e. a boring tool turret and a turning tool turret, so as to prevent unused tools from interfering with the workpiece.

Machine tools have been constructed wherein a main boring tool turret is mounted for pivoting about an axis parallel to that of the workpiece spindle on bracket which can be moved relative to the workpiece spindle in two directions, one parallel and the other at an angle to the workpiece spindle, and an auxiliary or turning tool turret is borne by the main turret and likewise mounted for pivoting about an axis parallel to that of the workpiece spindle so that each tool on the auxiliary turret can be selectively brought into the operative position while the main turret is in a predetermined inoperative angular position. However in the known machine, the auxiliary or turning tool turret is coaxially mounted on the main or boring tool turret, so that when the tools are in the inoperative position they are not always sufficiently disengaged from the inoperative tools and from the workpiece or the lathe tailstock, when work is carried out between centres.

The aim of the invention is to provide a machine tool of the aforementioned kind which is free from disadvantages thereof.

SUMMARY OF THE INVENTION

To this end, according to the invention, the auxiliary tool turret is eccentric with respect to the main tool turret so that, relative to the rotary workpiece spindle, it can occupy an operative position while the main turret is in its inoperative position.

Owing to this arrangement, when the main tool turret is in any operative angular position, the auxiliary tool turret is spaced at a distance from the working point of the operative tools, since it is eccentrically disposed on the main turret, so that the tools on the auxiliary turret are not likely to interfere with the workpiece, the tailstock or the boring tools.

Usually the tools on the auxiliary turret are turning tools, whereas the tools on the main turret are boring tools, but of course the main turret could also have turning tools, the number of which could then be increased.

Further features and advantages of the invention will appear from the following detailed description of a preferred embodiment, given with reference to the appended drawings.

BRIEF DESCRIPTION OF THE DRAWINGS

In the drawings:

FIG. 1 is a front view of part of a lathe according to the invention, showing a boring tool turret in the inoperative position and a turning tool turret in the operative position;

FIG. 2 is a corresponding fragmentary plan view, partly sectioned;

DESCRIPTION OF PREFERRED EMBODIMENT

Figure 3:
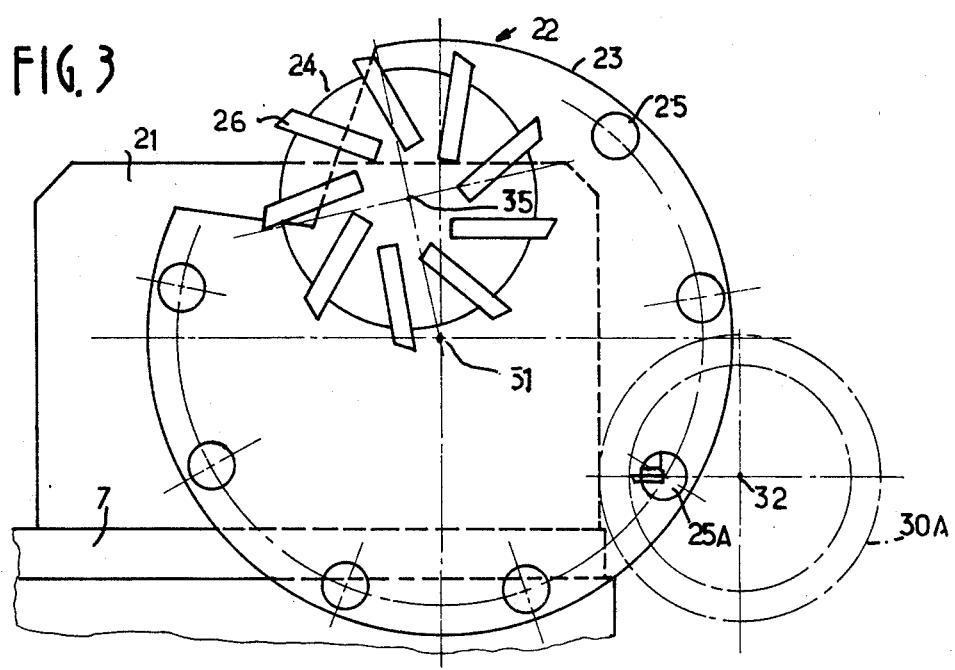
FIG. 3 is a front view corresponding to FIG. 1 but showing the boring tool turret in one of its operative positions.

FIGS. 1 and 2 are partial views of a lathe comprising a horizontal rotary workpiece spindle. The lathe comprises a bed 1, a carriage 2 which can move along longitudinal slide ways 3, 4 on the bed under the action of a suitable conventional control system comprising e.g. a lead screw 5 engaging in a nut 6, and a cross-slide 7 which can move on carriage 2 under the action of a suitable conventional control system comprising e.g. a nut 8 and a screw 9 rotated by a motor 11. In the example, the lathe has a back centre 14 mounted in a tailstock 15 which can be secured at any desired position along bed 1.

A bracket 21 secured on cross-slide 7 bears a turret assembly 22, comprising a main turret 23 and an auxiliary turret 24. Turret 23 carries boring tools 25, whereas turret 24 carries turning tools 26. The main turret 23 is pivotably mounted on bracket 21 for movement about a horizontal geometrical axis 31 parallel to the geometrical axis 32 of the lathe spindle, i.e. the geometrical axis of a mandrel 33 for workpieces 30 shown in broken lines on FIG. 1, and the geometrical axis of back centre 14.

The auxiliary turret 24 is pivotably mounted on the main turret 23 for movement about a geometrical axis 35 parallel to the geometrical axis 31 of the main turret 23.

Figure 4:
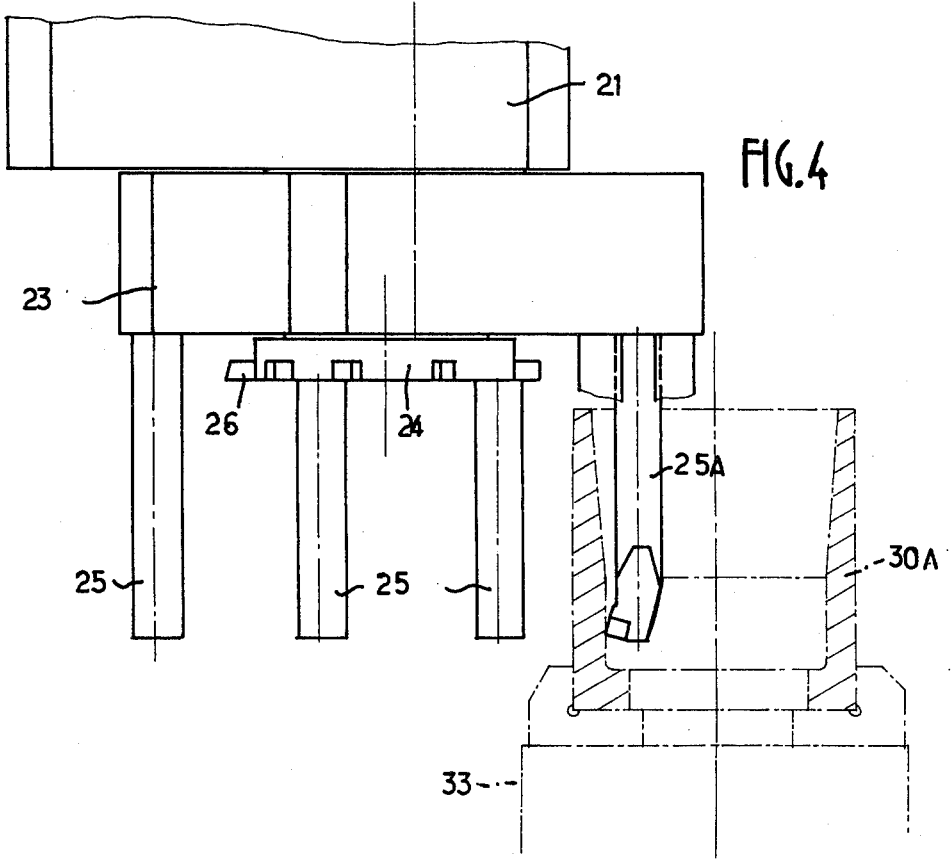
FIG. 4 is a partly sectioned plan view corresponding to FIG. 3.

The main turret 23 can be angularly indexed into any one of nine equally spaced positions. Seven of these positions are used for locating corresponding ones of the seven boring tools 25 in the operative position (See FIGS. 3 and 4). The eighth angular position, which is shown in FIGS. 1 and 2, is for locating any one out of nine turning tools 26 selectively in the operative position, depending on the angular position given to the auxiliary turret 24 on the main turret 23. Finally, the ninth angular position of the main turret 23 is an imaginary, unused position which simply follows from the design of the assembly and the need to eliminate two boring tools on the periphery of the main turret so as to keep clear the position of the auxiliary turret 24.

The periphery of the main turret 23 has a large slot 38 at the location of the auxiliary turret 24 so that it can be brought sufficiently near the axis of the back centre 14 and turning work can be carried out very near this centre, as shown in FIGS. 1 and 2.

The operation of the turret assembly is as follows:

When the main turret 23 is given the angular position shown in FIGS. 1 and 2, any of the turning tools 26 can be placed in the operative position by moving the auxiliary turret 24 into the corresponding angular position on the main turret 23 (FIGS. 1 and 2) without hindrance from the boring tools 25. If the main turret 23 is given a different angular position, corresponding to the positioning of any of the boring tools 25 at the same level as the axis 32 of the workpiece spindle, a workpiece 30A can be bored (FIGS. 3 and 4) without hinderance by the turning tools 26.

Figure 5:
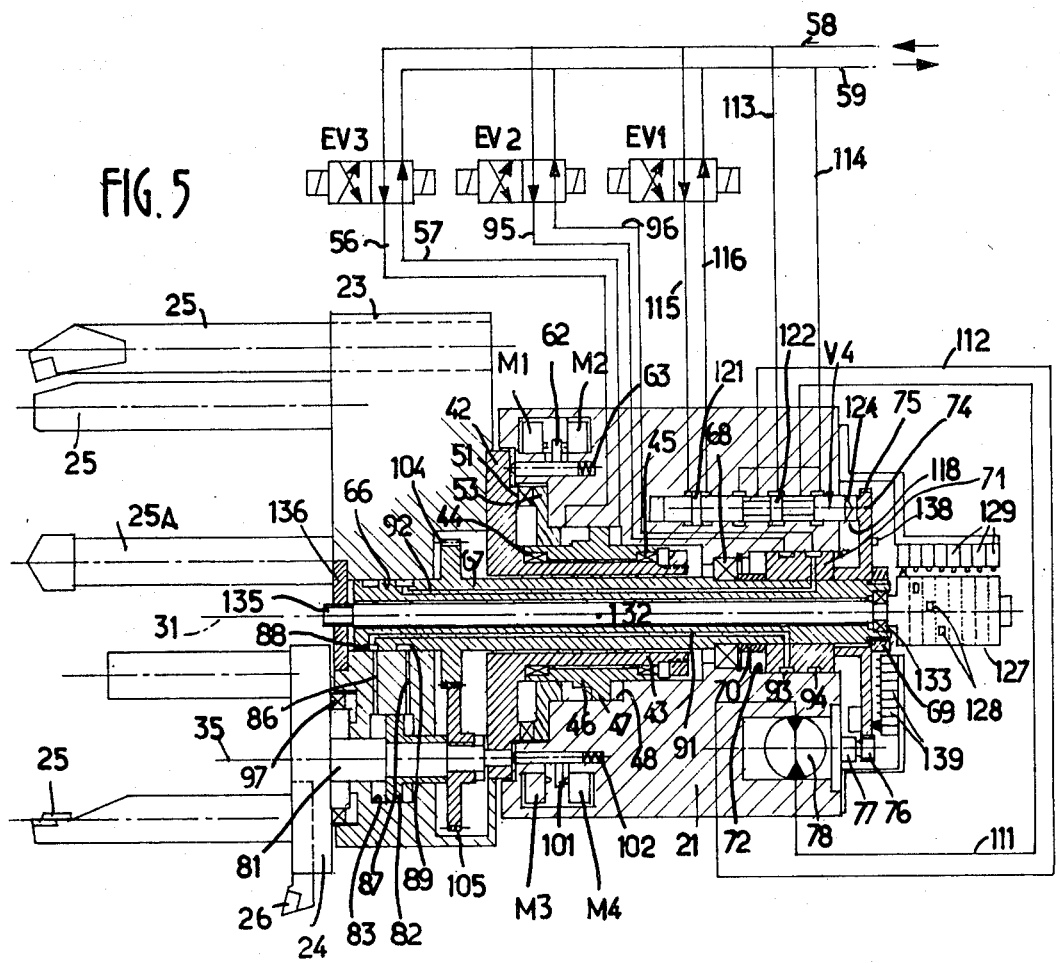
FIG. 5 is an expanded sectional view along the broken line V—V of FIG. 1 and showing hydraulic control circuits for the turrets.

FIG. 5, by way of example, shows a control system for angular indexing of the two turrets. The main turret 23 is rigidy secured to a baseplate 42 forming part of a sleeve 43 secured by two ball bearings or the like 44, 45 mounted in a sleeve 46 provided with a collar 47 which is slidable in a bore 48 in bracket 21.

The main turret 23 can be locked in position with high accuracy by a system of conventional conical annular teeth 51 forming claws, dogs or the like, part of which is secured to baseplate 42 and the other part of which is secured to an annular plate 53 rigidly secured in bracket 21. The tooth system 51 can be released by axial motion of turret 23 to the left (in the drawing), or can be engaged in the position represented, by means of a double-acting hydraulic ram, the piston of which is the collar 47 and the cylinder of which is the bore 48 in bracket 21. References 56, 57 respectively denote pipes for supplying the two chambers of the ram from two general pipes 58, 59 for supply and for connection to a feed tank, under the control of a solenoid valve EV3. The axial limits of the travel of the ram, and consequently of the main turret 23, are controlled by two micro-switches, M1, M2 actuated by a push button 62 which can be pushed back by baseplate 42 against the action of a return spring 63.

The front end of a tubular shaft 67 is rotatably and slidably mounted in a central bore 66 in the main turret 23. Shaft 67 extends with clearance through sleeve 43 and, near its other end, is centred and axially held in bracket 21 by ball bearings or the like 68. A nut 69 is screwed to the rear threaded end of shaft 67 and secures the following components to the shaft: a spacer ring 70, a cylindrical socket 71 which can rotate in a bore 72 in bracket 21, and a plate 74 whose periphery bears teeth 75 engaging a toothed gearwheel 76 secured to the shaft 77 of a hydraulic motor 78 mounted in bracket 21.

The auxiliary turret 24 is borne by a shaft 81 secured to the annular piston 82 of a double-acting hydraulic jack 82 whose cylinder is formed in the main turret 23. The two jack chambers are actuated by two main pipes 58, 59 via a circuit comprising the following: two ducts 86, 87 formed in the main turret 23, two annular grooves 88, 89 formed in the outer cylindrical surface of tubular shaft 67, two longitudinal ducts 91, 92 of the tubular shaft, two annular grooves 93, 94 formed in the outer cylindrical surface of ring 71 and two pipes 95, 96 actuated by a solenoid vale EV2.

The hydraulic jack 82, 83 is for axially moving the auxiliary turret 24 so as to engage or release a system of teeth or claws 97 for accurately locking the turret on to the main turret 23, similar to the locking of the main turret 23 on to bracket 21. The limits of the axial travel of auxiliary turret 24 are controlled by two micro-switches M3, M4 under the action of a press-butoon 101 which is pressed back by the inner end of shaft 81 against the action of a return spring 102.

The pivoting motion of the auxiliary turret 24 on the main turret 23, when the latter is prevented from rotation, is brought about by a hydraulic motor 78 via a transmission system comprising: toothed gearwheels 76, toothed wheel 75, tubular shaft 67 and a toothed wheel 104 borne by shaft 67 and engaging a toothed wheel 105 securedto shaft 81 of turret 24. Similarly, the main turret 23, when the auxiliary turret 24 is locked on to it, is pivoted by the hydraulic motor 78 via toothed gearwheel 76 and toothed whee 75 to shaft 67, which is then prevented from rotating with respect to the main turret 23 by toothed wheel 105, which is secured to the main turret 23 when the auxiliary turret 24 is locked thereto.

The supply to the hydrauic motor 78 is controlled by two pipes 111, 112 via control V4 and two pipes 113, 114 connected to the two main pipes 58, 59 respectively. Valve V4 is acted upon by a solenoid valve EV1 via two pipes 115, 116, and by a crown wheel 118 borne by plate 74.

The slide of the control valve V4 comprises: a first annular bead 121 by means of which the slide is moved in one or the other direction in response to information received by solenoid vave EV1; a secnd angular bead 122 which selectively injects oil under pressure from pipe 113 into pipe 111 or pipe 112 so as to rotate motor 78 in one or the other direction or hold it in equilibrium when inoperative; and an end needle valve 124 cooperating directly with crown wheel 118.

The selective angular indexing motion of the two turrets and the selective locking and release thereof is programmed by means of a drum 127 on which cams 128 are distributed for cooperating with micro-switches 129 carried by bracket 21. Drum 127 is secured on the rear end of a central shaft 132 which rotates on ball bearings 133 in the adjacent end of a tubular shaft 67, the other end of the shaft having a grooved part 135 which can slide in a corresponding grooved bore in a central plate 136 secured in the front surface of the main turret 23. Finally, the outer surface of plate 74 bears cam 138 cooperating with micro-switches 139 borne by bracket 21.

Figure 6:
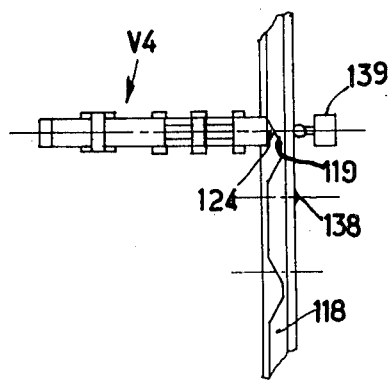
FIG. 6 is a detailed view of the control valve shown in FIG. 5, and an expanded partial view of the crown wheel with which it cooperates.

Programming of the motion of the two turrets is carried out as follows:

The lathe is, for example, the kind digitally controlled by a punched tape on which the complete programming of a cycle is recorded. It will be assumed that the turrets are in the postions shown in FIG. 1 and it is desired to bring the third boring tool 25A into the operative position. An order from the punched tape triggers the following sequence of operations:

Information to solenoid valve EV3, supply of hydraulic jack 47, 48 through pipe 57, release of main turret 23, information to micro-switch M1, information to solenoid valve EV1, supply of control valve V4 via pipe 116, supply of hydraulic motor 78 via pipe 111, pivoting of turret 23 via the transmission system comprising toothed gearwheel 76, toothed wheel 75, and tubular shaft 67 which is at present secured to the main turret 23 via the toothed wheel 105 of the auxiliary turret 24, which is at present locked and thus integral with the main turret 23; information to that one of the micro-switches 129 which is actuated by the cam 128 corresponding to the boring tool 25A, information to solenoid valve EV1 in the opposite direction, movement of the slide of control valve V4 to the exterior as a result of the pressure coming from pipe 115, pressing of the needle valve 125 of the slide against the slope of the corresponding notch 119 of wheel 118 (compare FIG. 6), a decrease in the flow rate of oil supplied to hydraulic motor 78 in proportion as the needle valve 124 moves along the slope of notch 119, possible passing of the exact indexing position followed by a slightly excessive downward movement of needle valve 24 into the notch and reenergization of the hydraulic motor 78 in the opposite direction, so that the indexing position is accurately obtained by balancing the slide of the control valve V4 in the middle of the slope of notice 119, actuation of solenoid valve EV3 to lock the main turret 23 in response to a timing relay informed by the corresponding micro-switch 139, and, finally, information to micro-switch M2, which authorises the beginning of the machining operation with the selected tool, which is now in the operating position.

If it is necessary to carry out a turning operation subsequently, the programming punched taped begins by triggering the movement of the main turret 23 into the angular indexing position shown in FIG. 1, in which the turning tool turret 24 is in the operating position. The main turret is released, indexed and re-blocked by a sequence of operations similar to that described for positioning the boring tool 25A.

The selected turning tool is moved into the operating position in the following manner:

Information to solenoid valve EV2 in response to an order given by the perforated tape for unlocking the auxiliary turret 24 under the action of a hydraulic jack 82, 83 supplied with oil under pressure by the following circuit: main pipe 58, solenoid valve EV2, pipe 96, annular groove 94, duct 92, annular groove 89 and duct 87; information to micro-switch M3; information to solenoid valve EV1; supply of motor 78 as before; pivoting of auxiliary turret 24 by motor 78 via gearwheel 76, toothed wheel 75, tubular shaft 67, toothed wheel 104 and toothed wheel 105, the main turret 23 being locked to bracket 21; information to that one of the micro-switches 139 which cooperates with the cam of plate 74 corresponding to the turning tool 26 selected by the programming tape; information to solenoid valve EV1 for the purpose of stopping the motor and putting it in the hydraulic equilibrium position as before; and, finally, locking the auxiliary turret 24 under the action of the hydraulic jack 82, 83 which is energized in the other direction by the following circuit: duct 86, annular groove 88, duct 91, annular groove 93, pipe 95 and main pipe 58 via solenoid valve EV2 which has been informed by a timing relay in response to actuation of the micro-switch 139 in question.

At the end of the locking of the auxiliary turret 24, micro-switch M4 is actuated and, in turn, informs the installation so that the turning operation can begin.

Of course, the invention is not limited to the embodiment described and shown by way of example; numerous modifications can be made thereto, depending on the intended applications, without thereby departing from the invention. For example:

In the embodiment described hereinbefore, it was assumed that the turrets were carried by a movable bracket, but the invention is also applicable to machines in which the turrets are held in a fixed position, whereas the headstock in which the workpiece spindle rotates is movable.

The cross-slide 7 on which the turret bracket 21 is secured could slide at an angle to the workpiece spindle, instead of sliding in a direction at right angles to the spindle axis.

In the embodiment described it is assumed that the main or boring turret carries only a single turning tool turret but a number of such turrets can be provided as required, each auxiliary turret being selected by angular indexing of the main turret.

Finally, one or more of the boring tools borne by the main turret could be replaced by turning tools.

I claim:

1. In a machine tool comprising a machine bed and a workpiece spindle mounted on said machine bed, said spindle being rotatable about its axis to rotate a workpiece to be machined, a tool turret assembly comprising:
    turret support means mounted on said machine bed, said turret support means and said workpiece spindle being relatively movable on said machine bed in a first direction parallel to the axis of said workpiece spindle and in a second direction at an angle to the axis of said workpiece spindle;
    a main tool turret for carrying a first plurality of tools, said main tool turret being carried by said turret support means for pivotal movement about an axis parallel to the axis of said workpiece spindle, said main turret having a predetermined inoperative angular position relative to said workpiece spindle; and an auxiliary tool turret for carrying a second plurality of tools, said auxiliary turret being carried by said main turret for pivotal movement about an axis parallel to the axis of the workpiece spindle, whereby each tool of said second plurality of tools can be selectively brought into an operative angular position relative to said workpiece spindle with said main turret in it predetermined inoperative angular position;
in which turret assembly the improvement comprises:
    said auxiliary turret being located eccentrically with respect to the pivotal axis of said main turret.

2. A tool turret assembly as claimed in claim 1, wherein said main turret has a slot in its periphery at the location of said auxiliary turret, said auxiliary turret projecting into said slot.

3. A tool turret as claimed in claim 1, further comprising:
    a hydraulic motor for stepping said main and auxiliary turrets about their pivotal axes for selectively positioning the tools carried by said turrets in an operative position;
    transmission means for transmitting angular movement from said motor to said turrets, said transmission means including ramp means; and
    a control valve for controlling the supply of hydraulic fluid to said hydraulic motor, said control valve having a control slide co-operating with said ramp means to stop said motor in a precise angular position.

4. A tool turret as claimed in claim 1, further comprising:
    a motor for stepping said main and auxiliary turrets about their respective pivotal axes for selectively positioning the tools carried by the said turrets in an operative position, said motor being mounted on said support means;
    transmission means for transmitting angular movement from said motor to said turrets;
    said transmission means comprising a first toothed wheel coaxial with said main turret and a second toothed wheel secured to said auxiliary turret and meshing with said first toothed wheel;
    means for locking said main turret relative to said support means whereby said transmission means transmits movement from said motor to said auxiliary turret; and means for locking said auxiliary turret relative to said main turret whereby said transmission means transmits movement from said motor to said main turret.

5. A tool turret assembly as claimed in claim 1, comprising a plurality of said auxiliary turrets each carried by said main turret and each located eccentrically with respect to the pivotal axis of said main turret.

* * * * *